United States Patent [19]

Cason et al.

[11] 4,454,592
[45] Jun. 12, 1984

[54] PROMPT LINE DISPLAY IN A WORD PROCESSING SYSTEM

[75] Inventors: William C. Cason, Austin; Freddie R. White, Georgetown; Thomas L. Adam; Lewis J. Levine, both of Austin, all of Tex.

[73] Assignee: International Business Machines Corporation, Armonk, N.Y.

[21] Appl. No.: 208,818

[22] Filed: Nov. 20, 1980

[51] Int. Cl.³ .............................................. G06F 3/14
[52] U.S. Cl. .................................... 364/900; 340/711; 340/721
[58] Field of Search ..................... 364/900 MS File; 340/711, 721

[56] References Cited
U.S. PATENT DOCUMENTS 3,750,135 7/1973 Carey et al. .................. 340/711 X
4,189,727 2/1980 Vaughn, Jr. ...................... 340/711

Primary Examiner—Raulfe B. Zache
Attorney, Agent, or Firm—Harold E. Meier

[57] ABSTRACT

The specification discloses a word processing system having a keyboard (10), a display (20), a processor (14) and a random access memory (22) for storing data and programs. The display (20) includes a first text area (24) wherein text entered through the keyboard is displayed. The display also includes a prompt line (26) through which all input between the operator and the word processing system occurs. The system provides deadkey compression wherein the depression of selected deadkeys on the keyboard causes the automatic generation of a required backspace in order to enable the construction of a diacritic character and the display of the constructed diacritic character in either the text display area (24) or the prompt line (26).

32 Claims, 11 Drawing Figures

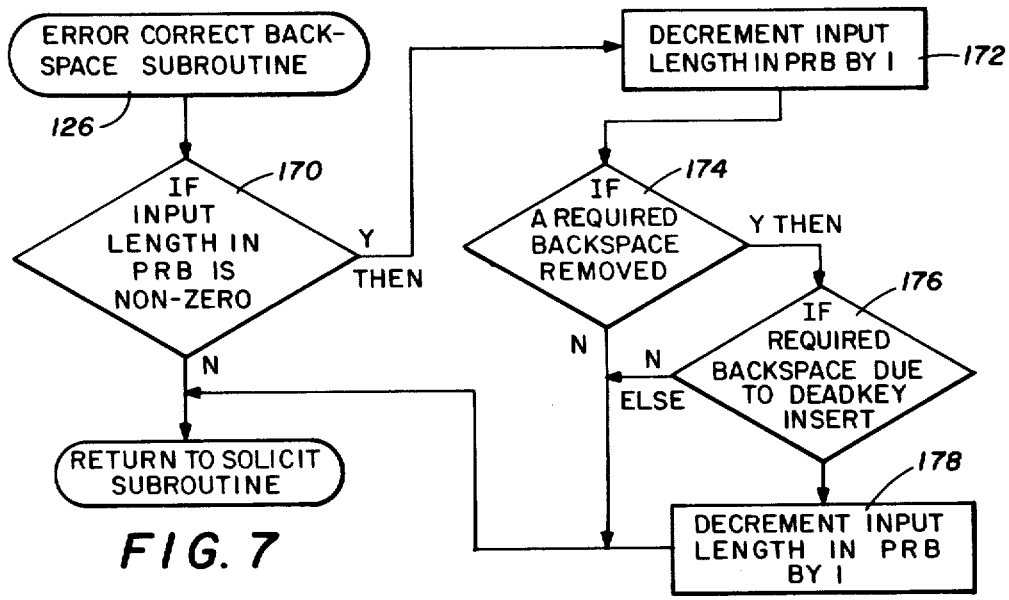
FIG. 7
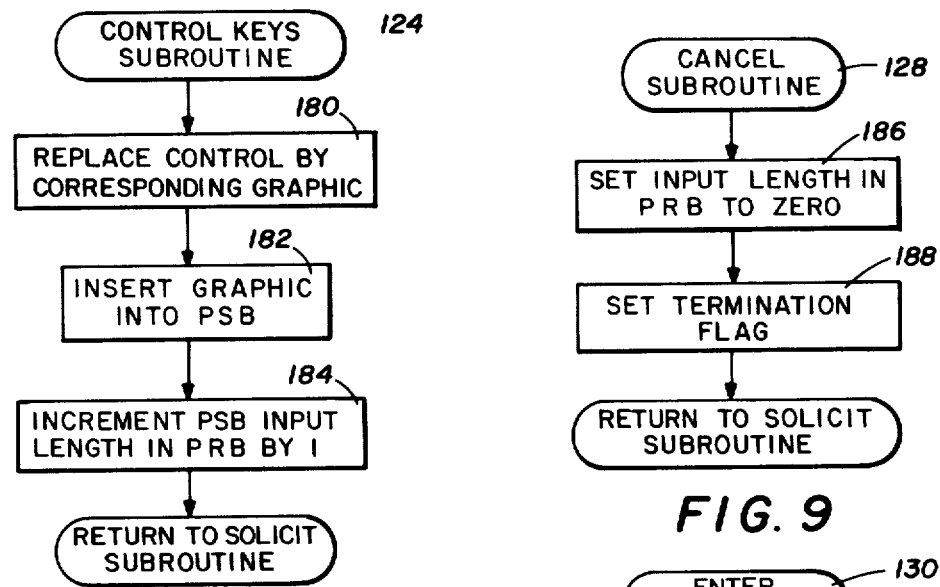
FIG. 8
FIG. 9
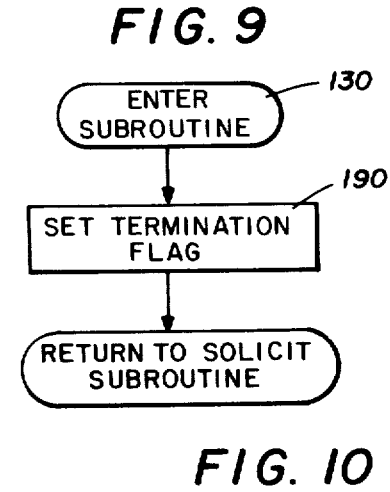
FIG. 10
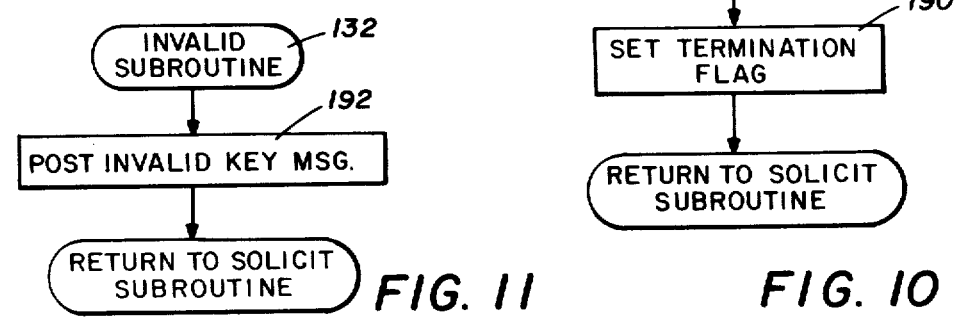
FIG. 11

PROMPT LINE DISPLAY IN A WORD PROCESSING SYSTEM

DESCRIPTION

1. Technical Field

This invention relates to word processing systems, and more particularly relates to word processing systems having a prompt line display through which interface to the word processing system occurs.

2. Background Art

Many word processing systems have been heretofore developed wherein an operator may key in characters through a keyboard, with the resulting test being displayed to the operator during input. The operator may edit the displayed text through manipulation of the keyboard. When the displayed text has been edited, the operator may cause the displayed test to be printed at a high rate by an associated printer.

In such word processing systems, instructions are sometimes presented to the operator through the display in order to accomplish foreground functions or tasks. These instructions have previously been displayed at various locations on the display and have often been difficult to visually perceive. In addition, data to be entered by the operator in prior systems has often been required to be entered at various locations on the display.

Further, in certain word processing systems having international language capabilities, it has been necessary to operate a plurality of keys in association with the backspace key in order to form certain characters in the foreign language, such as diacritic vowels and the like. The requirement to operate a plurality of keys has not only made operation of the system difficult, but has also tended to create mistakes. Furthermore, in many previously developed word processing systems having multilingual or diacritic capabilities, the operator has been unable to view the constructed diacritic character on the display, the character only being constructed at output when it is printed. The operator is thus unable in such systems to view the constructed characters prior to printing in order to correct any mistakes or to make any revisions.

In accordance with the present invention, a word processing system display is provided wherein all interface instructions to the operator and all responses from the operator to the system are displayed in a single predetermined prompt location. Further, the present invention incorporates a technique wherein diacritic characters may be displayed prior to printing with the manipulation of only two keyboard keys.

SUMMARY OF THE INVENTION

In accordance with the present invention, a word processing system is provided which has a keyboard and a visual display. Apparatus is provided to display on a first predetermined area of the display information entered through the keyboard to be processed by the processing system. A second predetermined area of the display presents all interface information transferred between the operator and the word processing system.

In accordance with another aspect of the invention, a word processing system having a keyboard and a display includes a first area on the display which is designated to display data input through the keyboard to be processed by the system. A second area on the display is designated to display only prompt instructions to the operator regarding action to be taken on the keyboard. The second area further displays prompt information for the processing system which is input through the keyboard by the operator. A processor is provided in the system for generating the prompt instructions and which is responsive to the prompt information entered by the operator in order to control word processing functions by the system.

In yet another aspect of the invention, a word processing system includes a keyboard for allowing the operator to enter data. A display is provided to display in a first predetermined area the data to be processed which is entered through the keyboard. A data processor is responsive to the keyboard for controlling the display of data on the display. A storage is associated with the data processor for storing data input through the keyboard. The storage contains stored program instructions for generating prompt instructions to the operator regarding action to be taken via the keyboard. The data processor is also operable to display the prompt instructions on a second predetermined area of the display. The keyboard is operable by the operator to generate system interface data. The data processor is operable to display the system interface data on the display in the second predetermined area of the display.

In yet another aspect of the invention, a method of word processing is provided which includes inputting data to be processed through a keyboard. The input data is then displayed in a first area of a display. Prompt instructions are generated to the operator regarding necessary action to be taken by the operator. The prompt instructions are displayed on the display on a second predetermined area. Operating instructions are displayed and responses input from the operator are displayed on the second area of the display only.

In yet another aspect of the invention, deadkey compression is provided in a word processing system having an input keyboard, a display and a printer. Apparatus is provided to store a code table of representations of diacritic characters. Apparatus is responsive to actuation of a plurality of keys on the input keyboard for searching the table for a single desired character and for displaying the desired diacritic character on the display. The desired diacritic character is then printed on the printer.

In accordance with yet another aspect of the invention, a method of deadkey compression in a word processing system includes actuating a predetermined deadkey on a keyboard representing a first character. A representation of the first character is then displayed. A backspace is automatically generated upon actuation of the deadkey in order to prevent spacing of the display past the displayed first character. A second key on the keyboard which represents a second character is then actuated. A representation of the second character is displayed in combination with the first character in order to construct a diacritic character. The constructed diacritic character is then printed.

DESCRIPTION OF THE DRAWINGS

For a more complete understanding of the present invention and for further objects and advantages thereof, reference is now made to the following detailed description taken in conjunction with the accompanying drawings in which:

FIG. 7 is a flow diagram of the error correct backspace subroutine;

FIG. 8 is a flow chart of the control keys subroutine;

FIG. 9 is flow diagram of the cancel subroutine;

FIG. 10 is a flow chart of the center subroutine; and

FIG. 11 is a flow chart of the invalid subroutine.

DESCRIPTION OF THE PREFERRED EMBODIMENT

Figure 1:
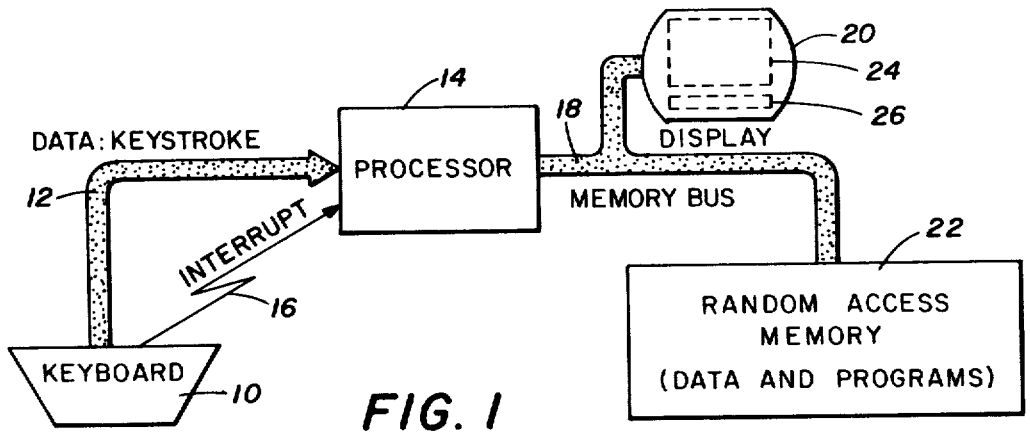
FIG. 1 is a block diagram of the present word processing system.

Referring to FIG. 1, a block diagram of the present word processing system is illustrated. The system includes a keyboard 10 which may comprise any conventional type of multi-key keyboard to enable the input of graphic characters and data. The keystroke information is applied via a data bus 12 to a processor 14. An interrupt signal may be applied from the keyboard 10 to the processor 14 via an interrupt line 16. The processor comprises a suitable microprocessor system for performing various control functions in order to enable data input from the keyboard to be processed, displayed and edited. The processor is connected via a memory bus 18 to a display 20. The memory bus 18 is also connected to a random access memory 22 which stores data and programs. A printer associated with the system is not illustrated.

The display 20 includes a first area 24 in which text entered through the keyboard 10 is displayed. An important aspect of the invention is the provision of a prompt line area 26 of the display 20. As will be subsequently described in greater detail, all interfacing between the operator and the word processing system is accomplished via displays on the prompt line 26. For example, the system will generate prompt instructions to the operator in order to inform the operator of desired or required actions to be taken via the keyboard. When the operator takes such actions on the keyboard, the resulting information is provided to the word processing system and is displayed on the prompt line 26. The display of all input information between the operator and the word processing system on a specified prompt line location substantially facilitates interaction between the system and the operator.

A message line will also be provided adjacent the prompt line 26 in order to enable specified messages, such as default or error messages, to be displayed to the operator. While the prompt line 26 is illustrated at the bottom of the display, it will be understood that the prompt line could also be provided at other areas of the display. In the preferred embodiment of the invention, the text area 24 of the display will comprise twenty video lines, with the prompt line comprising the twenty-fourth video line and the message line comprising the twenty-fifth video line. The top three lines are used for displaying the status and scale.

An important aspect of the invention is that all prompt instructions generated from the word processing system to the operator are video reversed at the prompt line location 26. Video reversed means that the background of the prompt line is reversed in color from the remaining portion of the displayed background and the displayed characters are reversed in color from the remaining characters on the screen. This reversed video display enables the operator to clearly see the prompt information. The information input on the prompt line 26 by the operator is not video reversed, so that the operator will be able to clearly distinguish the information input via the keyboard from the prompt instructions generated from the word processing system.

Figure 2:
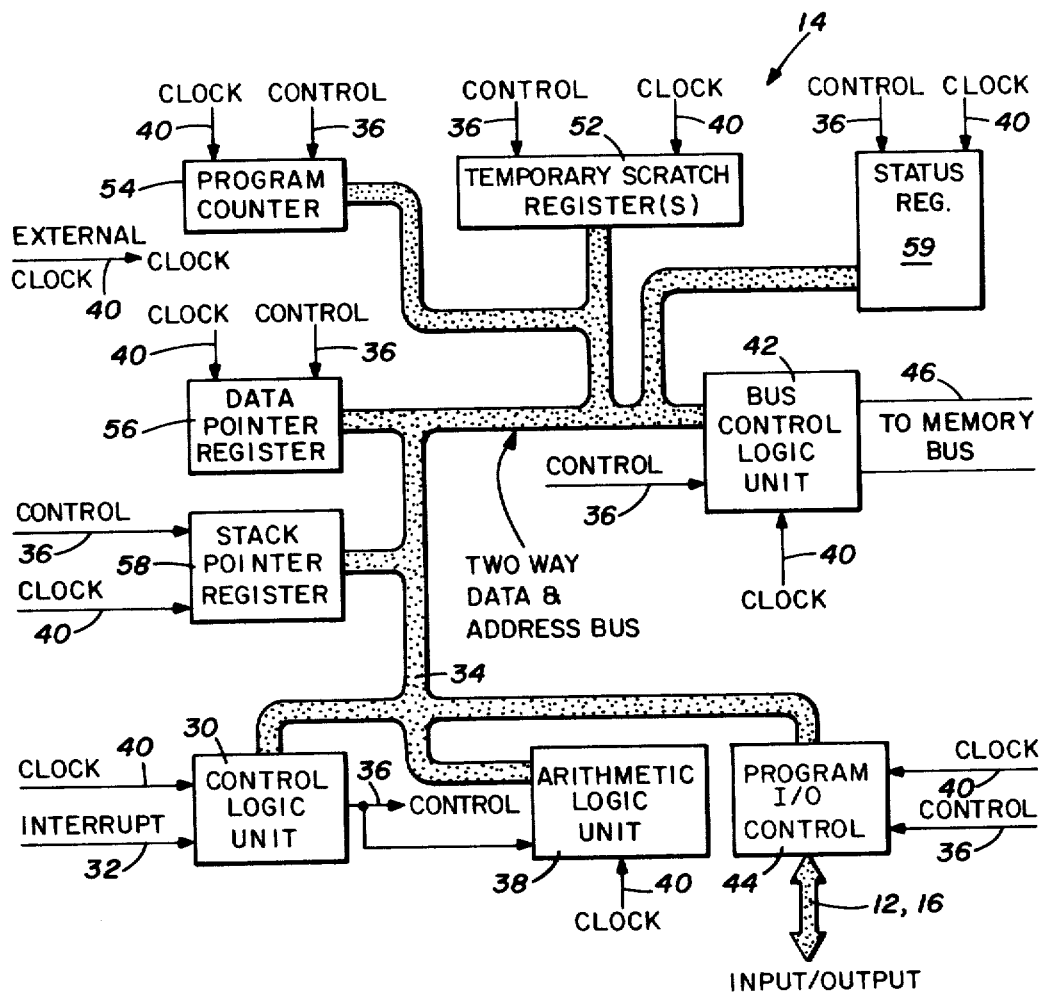
FIG. 2 is a block diagram of the processor shown in FIG. 1.

Referring to FIG. 2, the processor 14 is further detailed to show typical hardware elements as found in such processors. The processor may be a commercially available unit, such as from Intel Corporation and identified by the Number 8086. Such a processor includes a control logic unit 30 which responds to interrupts on a device bus 32 from the keyboard. The control logic unit 30 is also connected to the data and address bus 34 which is interconnected to various other logic units of the processor 14. In response to a fetch instruction from the random access memory, the control logic unit 30 generates control signals to other logic elements of the processor. These control signals are interconnected to the various elements by means of a control line 36 which is illustrated directly connected to an arithmetic logic unit 38 and identified as a "control" line 36 to other elements of the processor. Synchronous operation of the control unit 30 with other logic elements of the processor 14 is achieved by means of clock pulses input to the processor. The clock pulses are generated by an external clock source. This instruction bus is also shown interconnected to most of the other logic elements of the processor detailed in FIG. 2.

Data and instructions to be processed in the processor 14 are input through a bus control logic unit 42. Data to be processed may also come from program input/output control logic 44. The bus control logic 42 connects storage elements on the random access memory 22 and receives instructions for processing data received from the input/output control 44 or received from the random access memory. Thus, the input/output control 44 receives data from the keyboard or the random access memory 22 while the bus control logic 42 receives instructions and/or data from the same memory. Note that different storage sections of the random access memory are identifiable for instruction storage and data storage.

Device control information from the processor 14 is output through the program input/output controller 44 over a data bus. Input data on the data bus from the keyboard is processed internally through the processor by instructions on the bus 34 to the scratch register 52. The arithmetic logic unit, in response to a control signal on line 36 and in accordance with instructions received on the memory bus, performs arithmetic computations which may be stored in the temporary scratch registers 52. Various other transfers of data between the arithmetic logic unit 38 and other logic elements of the processor are of course possible. Such additional transfers may be to a program counter 54, a data pointer register 56 or a stack pointer register 58.

Also in the data stream for these various logic elements by means of the bus 34 is a status register 59. The particular operation of the processor is determined by instructions and data on the memory bus and input data on the bidirectional bus. As an example, in response to received instructions, the processor transfers data stored in the scratch registers 52 to one of the registers 56, 58 or 59. Such operations of processors as detailed in FIG. 2 are considered to be well known and understood by one of ordinary skill in the data processing field. A detailed description of each operation of the processor of FIG. 2 for the described invention is not deemed necessary for an understanding of the invention as claimed.

Figure 3:
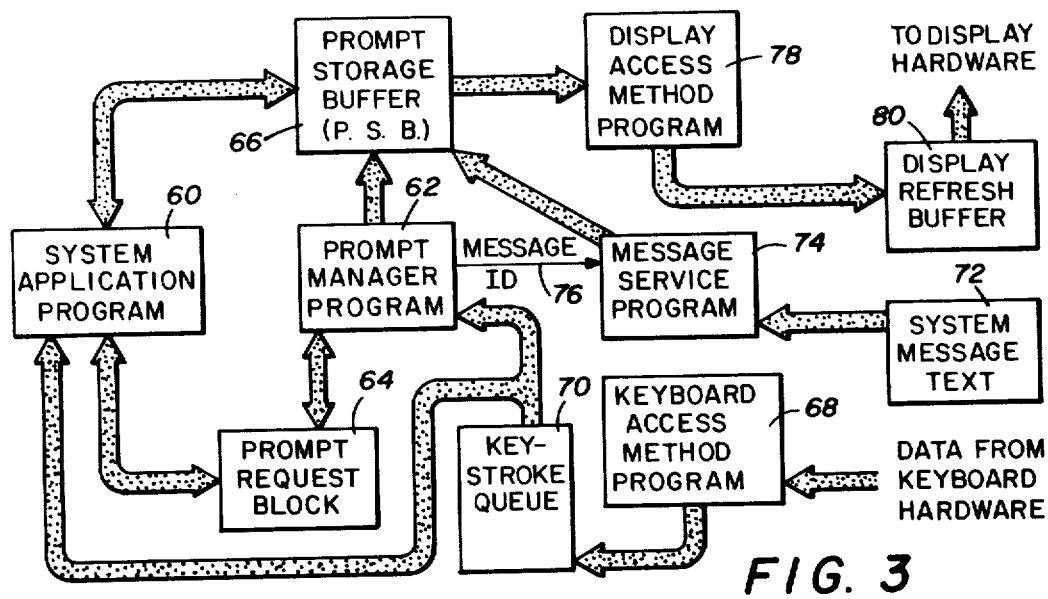
FIG. 3 is a block diagram of the random access memory shown in FIG. 1.

FIG. 3 is an illustration of the organization of the random access memory for the prompt system. A system application program 60 comprises a stored set of programs for accomplishing various functions for the overall word processing system. For example, a text create routine, a find program for locating spelling errors in the system, and other programs, comprises the system's application program which may be stored and operated at 60. The prompt manager program 62 operates under the control of the system application program 60 in order to accomplish subroutines requested by the system application program. For example, for the operation of a test create application, the system application program 60 would request through a prompt request block 64 that the prompt manager program 62 build in the prompt storage buffer 66 a character list describing a document to be edited. The prompt request block 64 comprises a portion of the random access memory. The prompt manager program 62 applies bits into the prompt request block (PRB) 64 which serves as a buffer for storage of flags and the like.

Data from the keyboard 10 is applied to a keyboard access message program 68 which operates to store the keystrokes in the keystroke queue 70. Upon request from the prompt manager program 62, the keystrokes stored in the queue 70 are applied to the prompt storage buffer 66 for storage. The keystroke queue 70 also drives the system application program 60.

Further detail on the keystroke queue 70 may be found in the co-pending patent application Ser. No. 208,621, entitled "Queuing of Work Request to Independent Task", filed concurrently herewith.

System message test is stored in 72 and the text may be called for by the message service program 74 and applied for storage in the prompt storage buffer 66. These messages are displayed by the system on the message line below the prompt line, as previously indicated. Information stored on the prompt storage buffer 66 is called for by the display access message program 78 and stored in the display refresh buffer 80 prior to being applied to the display hardware for display to the operator on the prompt line or on the message line.

Further detail on the operation of the display access message program 78 and the display refresh buffer 80 may be found in the co-pending patent application Ser. No. 208,568, entitled "Multi-Directional Cursor Motion", filed concurrently herewith.

In operation of the prompt line of the present word processing system, the system will initially prompt the operator for an input using a message displayed on the prompt line 26, followed by a cursored "freekey graphic" ▫. For example, the system may display on the prompt line the following message:

Type document name; press ENTER: ▫

The above message will be in reverse video as previously noted to draw the attention of the operator to the prompt line 26. The operator then begins to key in the requested document name. After the initial keystroke by the operator, the freekey graphic ▫ disappears, but the cursor _ remains and precedes the text input by the operator. For example, the display on the prompt line 26 in the above example would appear as follows after the operator had typed in "Document Name":

Type document name; press ENTER: Document Name _

The phrase "document name" which was entered by the operator would not be in reverse video to enable the operator to distinguish between the prompt information transmitted by the system and the data entered by the operator.

The system will operate to transmit a large number of other prompt requests to the operator based upon the necessity for information to be entered by the operator in order to perform the desired overall function of the word processing system. The following comprises a list of some of the various prompt requests which may be generated by the machine on the prompt line:

Type page number; press ENTER: ▫
Delete what?
Move what?
To where?
Copy what?
Find fwhat?
Type new keyboard number; press ENTER: ▫
Hyphenate where?
Press END
Type paper width in mm; press ENTER: ▫

Default values may also be presented to the operator at times on the prompt line 26. In addition, previously entered incorrect values may be presented on the prompt line 26 after the system detects that the value is incorrect. These default and incorrect values may cause the prompt line 26 to segment to the right.

It is possible to revise the text keyed on the prompt line, but such provision is limited to the error correcting backspace and the cancel key on the keyboard. The error correcting backspace will erase any character entered by the operator on the prompt line 26, including control graphics, such as "Required Carrier Return" and "Format Change." The operator is prevented from cursoring or editing the reverse video prompt shown on the prompt line 26. This prevents the operator from changing the information desired to be displayed from the system. If the operator desires to clear the entire answer the operator has entered on the prompt line and rekey the information, the operator may depress the "Cancel" key.

If the operator keys more characters on the prompt line 26 than the machine buffer can accommodate, the following message is displayed on the prompt line:

Too many characters. BKSP or CANCL.

When the cursor on the prompt line is positioned on the last character of the display line 26 and another character is entered by the operator, the prompt line will segment sixty characters to the right and move the cursor one character to the right.

An important aspect of the present invention is that the operator may desire to type in certain control characters on the prompt line 26 in order to answer certain prompt messages displayed by the system to provide certain desired control of the system. For example, the operator at times may type in characters such as "Carrier Return", "Required Carrier Return", "Tab", "Required Tab", "Index" and the like. Display of such characters on the prompt line 26 will not cause the functions represented by the keys to occur. Consequently, if the operator hits the "Carrier Return" key, a carrier return symbol will appear on the prompt line 26, but the system will not be provided with a carrier return function.

As previously noted, when the operator comes to a situation through operation of the keyboard that requires prompt information from the system in order to direct the operator to the next required step, the prompt line 26 will be utilized. For example, the present system has the capability to perform a "Find" function which enables the system to replace one word throughout the entire document with a second word, or alternatively, to locate spelling errors in the entire document. If the operator desires to perform such a function, the operator depresses the "Find" key on the keyboard. The system then displays the words "Find what" on the prompt line 26 in reverse video. The operator could then key in "Long", depress the enter key and the cursor would appear in the displayed test in area 24 on the word "Long." The operator could then key in the word "Short" which replaces the word "Long." The operator then deletes "Long." The operator would then press the "Find" key on the keyboard and the system would again ask "Find what" on prompt line 26. The operator would then type in "Enter" and the system would again find the word "Long" and the operator would type in the necessary information to replace "Long" with the word "Short."

In addition, another function is provided by the system which would enable the operator to instruct the system to automatically find all of the words "Long" and automatically replace all of those words with the word "Short."

In all such functions, all of the interface between the operator and the word processing system takes place on the prompt line 26.

After the operator has typed in the desired answer to a question on the prompt line 26, the operator is not allowed to type in addition information on the prompt line. If too many characters are input by the operator and the buffer is full, the system will indicate on the message line to the operator that an instruct error has occurred and the operator will be told to either backspace or cancel in order to provide the necessary information to the system.

Another important aspect of the present invention is termed "deadkey compression." This phrase refers to the ability of the system to convert certain multiple keystrokes into a single diacritic graphic under certain conditions. Normally, deadkey compression is not required for the English language. However, for many foreign languages, instances arise in which diacritic usages of vowels and the like are required. For example, in many foreign languages it is necessary to be able to type such characters as ö, ā and ñ.

The present system may be utilized according to an international formating program, which changes the keyboard configuration through the prompt line 26. Multiple international keyboards are available for operator selection. When it is desired to use the international keyboard, the operator may enter the necessary instructions through the keyboard using the prompt line 26. The system will then convert the existing keyboard to an international keyboard. Plaques are provided to the operator to be used to illustrate the new keyboard then in effect.

With the international keyboard in place, the present system may be operated to construct diacritic graphics with a minimum of keystrokes, without the requirement of a substantial amount of backspacing. In prior systems, it was necessary in many instances for the operator to actuate a desied character, then to actuate a backspace key and then to actuate a second character to construct the desired diacritic graphic. Further, the constructed diacritic graphic was often not displayed to the operator, but was visually constructed only at the time of printing. An important aspect of the present invention is that diacritic graphics may be constructed by the present system with a minimimum of keystrokes and the constructed diacritic graphic may be displayed to the operator either in the text area 24 of the display or in the prompt line 26. It may be necessary for the operator to display instructions to the word processing system which require the construction of diacritic characters and these characters must be able to be displayed on the prompt line 26.

The present invention enables the operator to construct the following diacritic characters, among others:
â: a Circumflex, Small
ä: a Diaeresis, Small
à: a Grave, Small
á: a Acute, Small
ã: a Tilde, Small
å: a Overcircle, Small
ç: c Cedilla, Small
ñ: n Tilde, Small
Â: A Circumflex, Cap.
Ä: A Diaeresis, Cap.
À: A Grave, Cap.
Á: A Acute, Cap.
Ã: A Tilde, Cap.
Ç: C Cedilla, Cap.
Ñ: N Tilde, Cap.
Ô: O Circumflex, Cap.
Ö: O Diaeresis, Cap.
Ò: O Grave, Cap.
Ó: O Acute, Cap.
Õ: O Tilde, Cap.

In order to accomplish the deadkey compression of the present invention, the operator first determines the diacritic character desired to be input and insures that the desired character may be accomplished on the keyboard then in effect. For example, assume that the operator desires to type â. With the invention, the operator would first hit a designated deadkey which would display the "^". Assuming that it was desired to display the diacritic character on the prompt line, the "^" would appear on the prompt line 26. An important aspect of the invention is that depression of the deadkey also automatically generates a required backspace. A required backspace is generated with the actuation of each deadkey on the keyboard. Each international keyboard may have a plurality of such deadkeys. The required backspace does not show on the display. The operator then next depresses the letter "a" and the constructed diacritic graphic "â" will then be displayed on the prompt line. The constructed diacritic character may also be produced by depression of the deadkey and the associated character in the text portion 24 of the display.

If desired, the operator could first actuate the key for "a", then depress the required backspace key, and then depress the deadkey in order to form the "â". This operation would, of course, require one additional key actuation. In the use of the deadkey, one code point will be generated in the data stream which will be sensed by the printer to print only a single diacritic character.

Operation by the operator of the error correcting backspace will remove the characters from the prompt line 26 placed thereon by deadkey compression in the reverse order in which they were keyed. Both the deadkey and its associated required backspace are removed with a single error correcting backspace.

Figure 4:
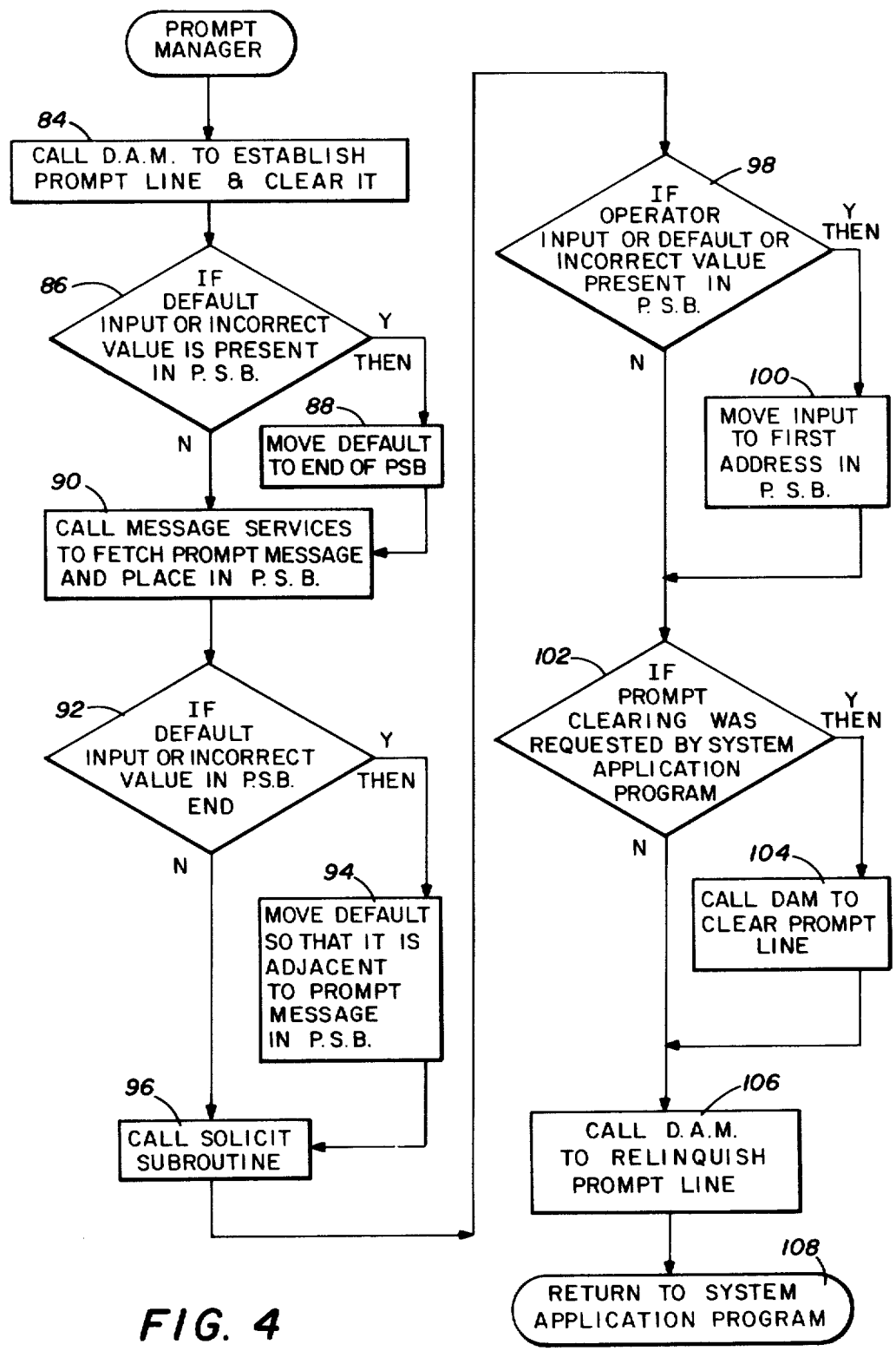
FIG. 4 is a flow diagram of the prompt manager routine according to the present invention.

By reference to FIGS. 4-11, further understanding of the operation of the present prompt line system may be accomplished. FIG. 4 illustrates the flow diagram of the prompt manager program 62 shown in FIG. 3 and stored in the random access memory 22 (FIG. 1). At 84, the display access method program is called and the prompt line is established and cleared. A decision is made at 86 as to whether or not a default input or incorrect value is present in the prompt storage buffer 66. If the answer is "yes", then the default indication is moved to the end of the prompt storage buffer at 88. If the answer is "no", then the message service program 74 is called at step 90. The message service program is called in order to fetch the prompt message and place it in the prompt storage buffer 66. The message service program 74 takes the identification and fetches the prompt message and stores it in the prompt storage buffer. A decision is made at 92 again if a default input or incorrect value is present in the prompt storage buffer. If the answer is "yes", the default is moved at 94 back up adjacent the message so that the system has one long contextual buffer.

The solicit subroutine is then called at 96. The operation of the solicit subroutine will be discussed with reference to FIG. 5. A decision is made at 98 as to whether or not an operator input, default or incorrect value is present in the prompt storage buffer 66. If the answer is "yes", the operator has entered a value to be returned to the application program. The input is then moved at 100 to the first address in the prompt storage buffer 66.

A decision is made at 102 as to whether or not the prompt clearing was requested by the system application program. If the answer is "yes", the display access method program is called at 104 in order to clear the prompt line. The display access method program is called at 106 to relinquish the prompt line and at 108 the system is returned to the system application program.

Figure 5:
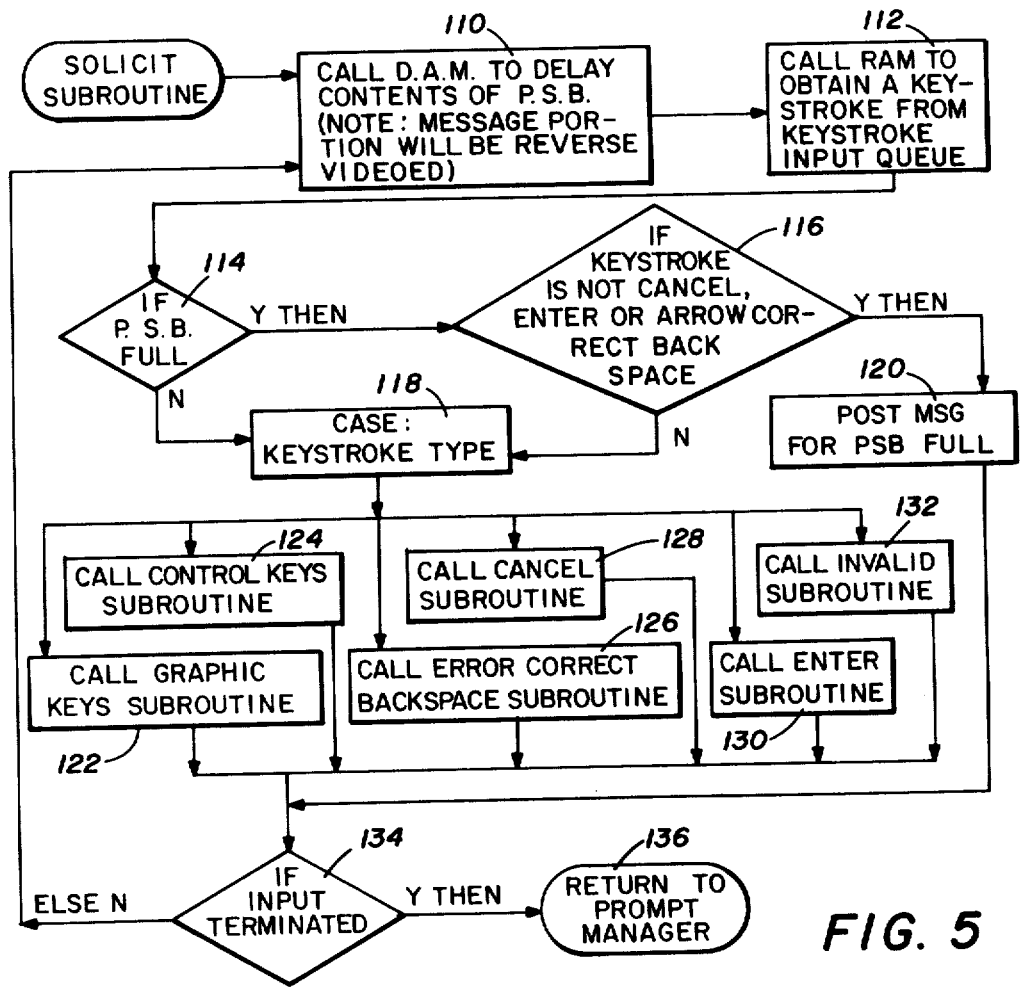
FIG. 5 is a flow diagram of the solicit subroutine according to the present invention.

FIG. 5 illustrates the operation of the solicit subroutine which was called at step 96 in FIG. 4. At step 110, the display access method program is called in order to display the contents of the prompt storage buffer 66. The display access method is indicated through an instruction that the message portion will be displayed in reverse video. At 112, the random access memory is called in order to obtain a keystroke from the keystroke input queue 70. A decision is made at 114 as to whether or not the prompt storage buffer 66 is full. If the answer is "yes", then the decision is made at 116 as to whether or not the keystroke is not "Cancel", "Enter" or "Error Correct Backspace." If the answer is "no", the keystroke is distributed to the appropriate subroutine at 118. If the answer is "yes", then a message is posted at 120 indicating to the operator that the prompt storage buffer 66 is full and that the operator should backspace or cancel.

The decision must be made at 118 as to what type of keystroke is present to be displayed. Depending upon the type of character to display, a particular subroutine is then called. For example, at 122, the graphic keys subroutine would be called. At 124, the control keys subroutine would be called. At 126, the error correct backspace subroutine would be called. At 128, the cancel subroutine would be called. At 130, the enter subroutine would be called. At 132, the invalid subroutine would be called. A decision is made at 134 as to whether or not the input has been terminated. If "no", the program is reiterated beginning at step 110. IF "yes", the system is returned to the prompt manager program 62 at step 136. At 134, a decision is made depending upon whether or not a flag has been set in one of the temporary registers in the processor regarding the calling of a subroutine at steps 122-132.

Figure 6:
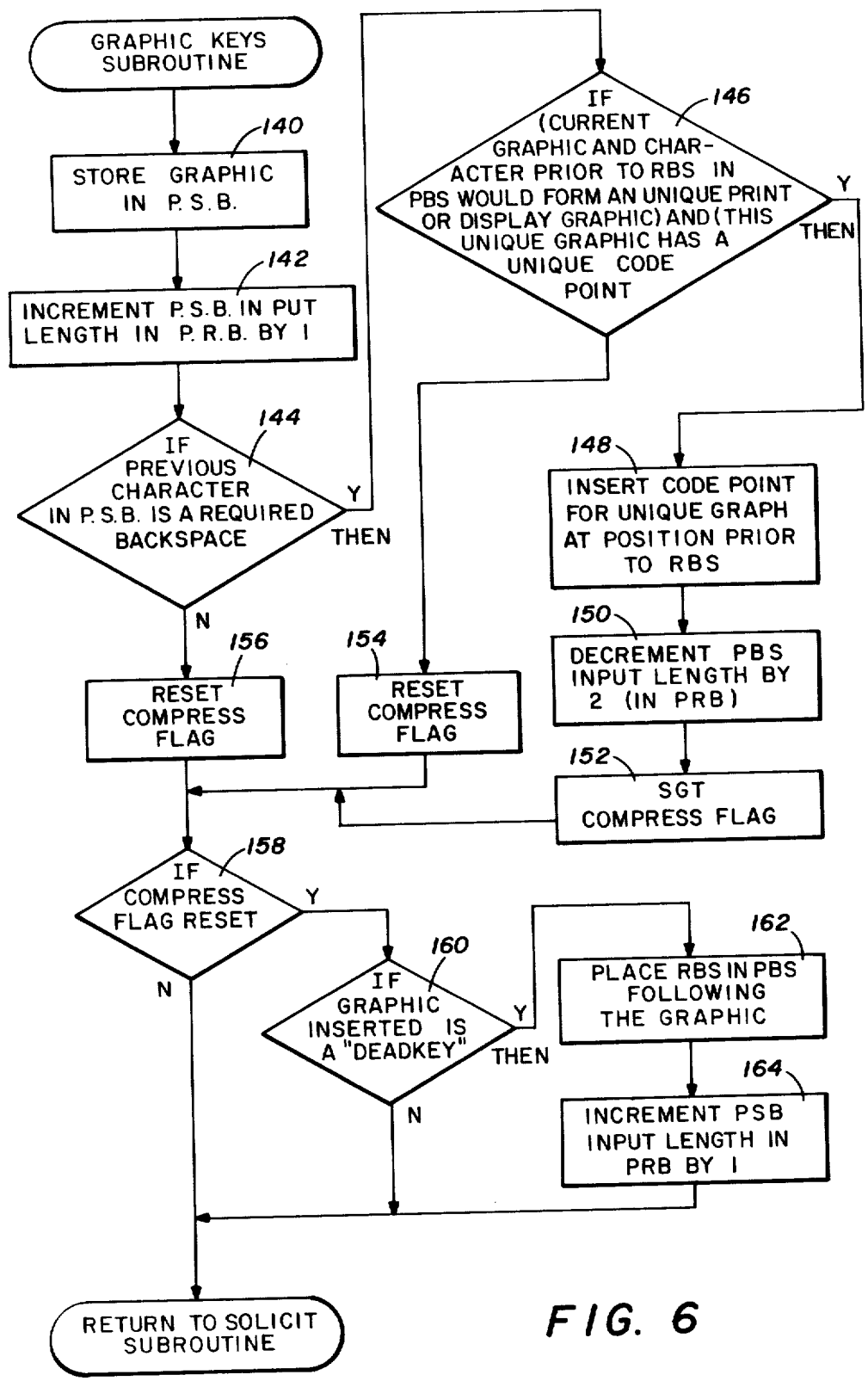
FIG. 6 is a flow diagram of the graphic keys subroutine.

FIG. 6 illustrates the graphic keys subroutine which is used to perform deadkey compression by the invention. At 140, a graphic is stored in the prompt storage buffer 66. At 142, the prompt storage buffer 66 length is incremented by incrementing the input length stored in the prompt storage buffer by one. At 144, a decision is made as to whether or not the previous character in the prompt storage buffer is a required backspace. If "yes", then a decision is made at 146 as to whether or not the current graphic and character prior to the required backspace in the prompt storage buffer would form a unique print or display graphic and also whether or not this unique graphic has a unique code point in a stored code listing table in the memory. If so, then the system is in the deadkey compression mode. If the answer at 146 is "yes", the code point is inserted at the position prior to the required backspace at 148. At 150, the prompt storage buffer input length in the PRB 64 is decremented by two and the compress flag is set at 152.

If the answer at 146 is "no", compression may not be accomplished and the reset compress flag is reset at 154. In addition, if the answer at 144 is "no", then the compress flag is reset at 156.

At 158, a decision is made as to whether or not the compress flag has been reset. If not, the system returns to the solicit subroutine previously described. If the answer is "yes", a decision is made at 160 as to whether or not the graphic inserted is a deadkey or not. If "yes", then the required backspace is automatically placed in the prompt storage buffer following the graphic at 162. The prompt storage buffer length is incremented at 164 by incrememting the input length by one and the system returns to the solicit subroutine. The system then automatically places a required backspace into the operation of the system in order to provide the deadkey compression mentioned above.

FIG. 7 is a flow diagram of the error correct backspace subroutine 126. A decision is made at 170 as to whether or not the input length in the prompt request block 64 is non-zero. If the answer is "no", the system is returned to the solicit subroutine. If the answer is "yes", then the input length in the prompt request block 64 is decremented by one at 172. At 174, a decision is made as to whether or not a required backspace has been removed. If the answer is "no", the system returns to the solicit subroutine. If the answer is "yes", a decision is made at 176 as to whether or not the required backspace is due to a deadkey insert. If the answer is "no", the system returns to the solicit subroutine. If the answer is "yes", the input length in the prompt request block 64 is decremented by one at 178 and the system is then returned to the solicit subroutine. This has the effect of deleting the required backspace associated with the deadkey.

FIG. 8 illustrates the control keys subroutine 124. The control, such as a carrier return, is replaced by the corresponding graphic representing the control at 180.

The graphic is inserted at 182 into the prompt storage buffer. The prompt storage buffer input is incremented at 184 by one in the prompt request block. The system is then returned to the solicit subroutine previously described.

FIG. 9 illustrates the cancel subroutine 128. The input length in the prompt request block is set to zero at 186. The termination flag is set at 188 and the system is then returned to the solicit subroutine.

FIG. 10 illustrates the enter subroutine 130. At 190, the termination flag is set and the system then returns to the solicit subroutine.

FIG. 11 illustrates the invalid subroutine 132. At 190, the invalid key message is posted and then the system returns to the solicit subroutine.

It may thus be seen that the present invention provides substantial improvements to a word processing system. The present system provides a dedicated location for a prompt line so that interfacing with the system between the operator and the system may only be accomplished at a dedicated location on the display screen. The present system provides substantial editing capabilities and provides ability for deadkey compression in order to eliminate the requirement of excessive keying by the operator and in order to display the constructed diacritic graphic on either the prompt line or on the text display prior to printing.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a word processing system having a keyboard, visual display and a processor responsive to said keyboard for controlling said visual display, the combination comprising:

first means controlled by said processor for displaying on a first predetermined area of the display information entered through the keyboard to be processed by the processing system, and second means controlled by said processor for displaying on a second predetermined dedicated area of the display prompt instructions to inform the operator of desired or required actions to be taken via said keyboard, said second means also for displaying on said second predetermined dedicated area all information input by said operator in response to said prompt instructions.

2. The combination defined in claim 1 wherein said prompt instructions control the performance of the functions of the word processing system.

3. The system as defined in claim 1 and further comprising:

means responsive to the keyboard for displaying control characters on said second predetermined area while suppressing the control functions represented by the displayed control characters.

4. The system as defined in claim 1 and further comprising:

a third predetermined area of the display for displaying error exception messages to the operator to note errors made by the operator on the keyboard.

5. The system as defined in claim 1 and further comprising:

means controlled by said processor for enabling the operator to revise only information displayed on said second predetermined area on the display entered through the keyboard.

6. The system as defined in claim 1 and further comprising:

means controlled by said processor for displaying a cursor in said second predetermined area to indicate to the operator the location for information to be entered through the keyboard by the operator.

7. The system as defined in claim 1 and further comprising means responsive to a requirement for the operator to interface with the word processing system for coupling the output of the keyboard to said second predetermined area of the display.

8. The system as defined in claim 1 and further comprising:

deadkey compression means responsive to actuation of a plurality or predetermined keys on the keyboard for constructing and displaying on said visual display a single character which is not shown on the keyboard.

9. A prompt display in a word processing system having a keyboard and a display comprising:

a first area on said display designated to display data input through the keyboard to be processed by the system, a second area on said display designated to display prompt instructions to the operator regarding action to be taken on the keyboard, said second area further displaying prompt information for the processing system input through the keyboard by the operator, and processing means for generating said prompt instructions and responsive to the prompt information entered by the operator for controlling word processing functions by the system, said processing means also serving to generate said first and second area on said display.

10. The word processing system of claim 9 and further comprising:

means responsive to the keyboard for displaying control characters on said second predetermined area while suppressing the control functions represented by the displayed control characters.

11. The word processing system of claim 9 and further comprising:

a third predetermined area of the display for displaying error exception messages to the operator to note errors made by the operator on the keyboard.

12. The word processing system of claim 9 and further comprising:

means controlled by said processing means for preventing the operator from revising information displayed on said second predetermined area on the display by said processing means.

13. The word processing system of claim 9 and further comprising:

means controlled by said processing means for displaying a cursor in said second area to indicate to the operator the location for information to be entered through the keyboard by the operator.

14. The word processing system of claim 9 and further comprising:

deadkey compression means responsive to actuation of a plurality of predetermined keys on the keyboard for constructing and displaying a single character which is not shown on the keyboard.

15. The word processing system of claim 14 wherein depression of one of said predetermined keys generates a character and a backspace.

16. A word processing system comprising:
a keyboard for allowing the operator to enter data,
a display for displaying in a first predetermined area data to be processed which is entered through said keyboard,
data processing means responsive to said keyboard for controlling the display of data on said display,
storage means connected to said data processing means for storing data input through said keyboard,
said storage means containing stored program instructions for generating prompt instructions to the operator regarding action to be taken via said keyboard,
said data processing means operable to display said prompt instructions on a second predetermined area of said display,
said keyboard operable by the operator to generate system interface data, and
said data processing means operable to display said system interference data on said display in said second predetermined area.

17. The word processing system of claim 16 and further comprising:
means controlled by said data processing means for allowing only selective editing of said system interface data.

18. The word processing system of claim 16 and further comprising:
said data processing means allowing selected function representations to be displayed on said second predetermined area of said display while inhibiting the performance of the function by the system.

19. The word processing system of claim 16 wherein said prompt instructions are displayed video reversed from the data in said first predetermined area.

20. The word processing system of claim 16 wherein said keyboard includes at least one deadkey which when actuated automatically generates a required backspace in addition to a character in order to allow the construction of a diacritic character.

21. A method of word processing comprising:
inputting data to be processed,
displaying said input data in a first area of a display,
generating prompt instructions to the operator regarding necessary action by the operator,
displaying said prompt instructions on a second area of the display, and
displaying operating instructions and responses to said prompt instructions from the operator on said second area of the display.

22. The method of claim 21 and further comprising: displaying said operating instructions video reversed from said input data and said responses.

23. The method of claim 21 and further comprising: displaying selected control functions on said second area of the display while inhibiting the actuation of the functions.

24. The method of claim 21 and further comprising: automatically generating a required backspace upon the actuation of predetermined deadkeys on the keyboard.

25. In a word processing system having an input keyboard, a display and a printer, deadkey compression apparatus comprising:

means for storing a table of code points representing characters,
means responsive to actuation of a plurality of keys on the input keyboard for searching said table for unique code points represented by actuation of at least two keys on the keyboard,
means connected to said means for searching responsive to the location of a unique code point for performing deadkey compression to combine characters represented by the keys into a desired diacritic character,
means for displaying the desired diacritic character on the display, and
means for printing the desired diacritic character on the printer.

26. The system of claim 25 wherein actuation of predetermined deadkeys on the keyboard display a character on the display while automatically preventing escapement of the display from the displayed character in order to allow construction of a combined diacritic character.

27. The system of claim 25 wherein said desired diacritic character is displayed on a prompt line separate and apart from the area on the display where text data is displayed.

28. The system of claim 25 wherein depression of one of said keys automatically generates an backspace and a designated character.

29. A method for deadkey compression in a word processing system comprising:
actuating a predetermined deadkey on a keyboard representing a first character,
displaying a representation of the first character,
automatically generating a backspace upon actuation of the deadkey in order to prevent spacing of the display past the displayed first character,
actuating a second key on the keyboard which represents a second character,
displaying a representation of the second character in combination with the first character in order to construct a diacritic character, and
printing out the constructed diacritic character.

30. In a word processing system having a keyboard, visual display and a processor responsive to said keyboard for controlling said visual display, the combination comprising:
first means controlled by said processor for displaying on a first predetermined area of the display information entered through the keyboard to be processed by the processing system,
second means controlled by said processor for displaying on a second predetermined dedicated area of the display all interface information transferred between the operator and the word processing system, said interface information controlling the performance of the functions of the word processing system, and
means responsive to the keyboard for displaying control characters on said second predetermined area while suppressing the control functions represented by the displayed control characters.

31. In a word processing system having a keyboard, visual display and a processor responsive to said keyboard for controlling said visual display, the combination comprising:
first means controlled by said processor for displaying on a first predetermined area of the display information entered through the keyboard to be processed by the processing system, second means controlled by said processor for displaying on a second predetermined dedicated area of the display all interface information transferred between the operator and the word processing system, said interface information controlling the performance of the functions of the word processing system, and a third predetermined area of the display for displaying error exception messages to the operator to note errors made by the operator on the keyboard.

32. In a word processing system having a keyboard, visual display and a processor responsive to said keyboard for controlling said visual display, the combination comprising:

first means controlled by said processor for displaying on a first predetermined area of the display information entered through the keyboard to be processed by the processing system, second means controlled by said processor for displaying on a second predetermined dedicated area of the display all interface information transferred between the operator and the word processing system, said interface information controlling the performance of the functions of the word processing system, and means for enabling the operator to revise only information displayed on said second predetermined area on the display entered through the keyboard.

* * * * *